United States Patent
Tokunari et al.

(10) Patent No.: US 12,532,670 B2
(45) Date of Patent: Jan. 20, 2026

(54) VERTICAL TRANSMON STRUCTURE AND ITS FABRICATION PROCESS

(71) Applicant: INTERNATIONAL BUSINESS MACHINES CORPORATION, Armonk, NY (US)

(72) Inventors: Masao Tokunari, Yokohama (JP); Naoki Kanazawa, Yokohama (JP); Akihiro Horibe, Yokohama (JP); Kuniaki Sueoka, Sagamihara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 857 days.

(21) Appl. No.: 17/545,985

(22) Filed: Dec. 8, 2021

(65) Prior Publication Data
US 2023/0180630 A1 Jun. 8, 2023

(51) Int. Cl.
*H10N 60/01* (2023.01)
*G06N 10/00* (2022.01)

(52) U.S. Cl.
CPC ......... *H10N 60/0688* (2023.02); *G06N 10/00* (2019.01); *H10N 60/0912* (2023.02)

(58) Field of Classification Search
CPC . H10N 60/0688; H10N 60/0912; G06N 10/00
See application file for complete search history.

(56) References Cited

U.S. PATENT DOCUMENTS

| | | | |
|---|---|---|---|
| 9,177,814 B2 | 11/2015 | Chang et al. | |
| 9,524,470 B1 | 12/2016 | Chow et al. | |
| 10,235,635 B1 | 3/2019 | Abdo | |
| 10,256,392 B1 | 4/2019 | Brink et al. | |
| 10,446,736 B2 | 10/2019 | Hertzberg et al. | |
| 10,497,746 B1 | 12/2019 | Rosenblatt et al. | |
| 10,615,223 B2 | 4/2020 | Rosenblatt et al. | |
| 10,840,428 B2 | 11/2020 | Kanazawa et al. | |
| 11,276,727 B1 * | 3/2022 | Renzas | H10N 69/00 |
| 2020/0287117 A1 | 9/2020 | Kanazawa et al. | |

* cited by examiner

*Primary Examiner* — Paul A Wartalowicz
(74) *Attorney, Agent, or Firm* — Amin, Turocy & Watson, LLP

(57) ABSTRACT

A vertical transmon qubit structure, includes a substrate having a first surface and a second surface. A through-silicon-via (TSV) is located in the substrate. A first electrode of a Josephson junction (JJ) is located on a portion of the first surface of the substrate and adjacent to the TSV. A second electrode of the JJ is in contact with the TSV and on a second portion of the first surface of the substrate. The first electrode is separated from the second electrode by an insulator.

16 Claims, 17 Drawing Sheets

- No electron beam necessary
- No double angle deposition necessary

MASK FOR BOTTOM ELECTRODE

DEPOSIT & LIFT-OFF BOTTOM AL ELECTRODE

MASK FOR RIE

FABRICATE TSV BY RIE

THERMAL OXIDATION OF BOTTOM ELECTRODE SIDEWALL

REMOVE TOP RESIST AND APPLY ANOTHER MASK FOR TOP ELECTRODE

DEPOSIT Al ON TOP AND SIDEWALL OF TSV

REMOVE ALL MASKS

VERTICAL TRANSMON STRUCTURE AND ITS FABRICATION PROCESS

BACKGROUND

Technical Field

The present disclosure generally relates to superconducting structures, and more particularly, to superconducting transistor structures and methods of creation thereof.

Description of the Related Art

Superconducting quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate is a generalization of a logic gate, however the quantum gate describes the transformation that one or more qubits will experience after the gate is applied on them, given their initial state. A quantum architecture is often configured in two dimensions, and it can be challenging to implement the processing architecture for a quantum computer in a limited amount of available space. Further, many quantum phenomena, such as superposition and entanglement, do not have analogs in the world of classical computing and therefore may involve special structures, techniques, and materials.

SUMMARY

According to an embodiment, a method of fabricating vertical transmon qubit structure includes providing a substrate having a top surface and a bottom surface. A first layer of aluminum (Al) is provided on the bottom surface the substrate. A first photoresist layer is provided on portions of the bottom surface of the substrate and the Al layer. A first layer of niobium (Nb) is on a bottom side of the substrate. A second photoresist layer is provided on the top surface of the substrate with an opening in a center portion of the substrate. A through silicon via (TSV) is created in the center portion of the substrate by way of etching the substrate in the center portion of the substrate. A second layer of Al is deposited within the TSV. Portions of the second photoresist layer are removed. A second layer of Nb is deposited on a top side of the substrate. The first Nb layer below the first resist layer and the second Nb layer above the second resist layer as well the first and second resist layers are removed.

According to one embodiment, a method of fabricating vertical transmon qubit structure includes providing a substrate having a top surface and a bottom surface. A first layer of aluminum (Al) is provided on the bottom surface the substrate. A first photoresist layer is provided on portions of the bottom surface of the substrate and the Al layer. A second photoresist layer is provided on the top surface of the substrate with an opening in a center portion of the substrate. A first layer of niobium (Nb) is provided on a bottom side of the substrate. A through silicon via (TSV) is created in the center portion of the substrate by way of etching the substrate in the center portion of the substrate. A self-assembled monolayer (SAM) of a third photoresist layer is provided on the bottom side and a top side of the substrate but not in a middle portion of the first photoresist layer. A second layer of Al is deposited within a base of the TSV. The third photoresist layer is removed. A second layer of Nb is deposited on a top side of the substrate. The first Nb layer below the first resist layer and the second Nb layer above the second resist layer as well the first and second resist layers are removed.

A vertical transmon qubit structure, includes a substrate having a first surface and a second surface. A through-silicon-via (TSV) is located in the substrate. A first electrode of a Josephson junction (JJ) is located on a portion of the first surface of the substrate and adjacent to the TSV. A second electrode of the JJ is in contact with the TSV and on a second portion of the first surface of the substrate. The first electrode is separated from the second electrode by an insulator.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1A:
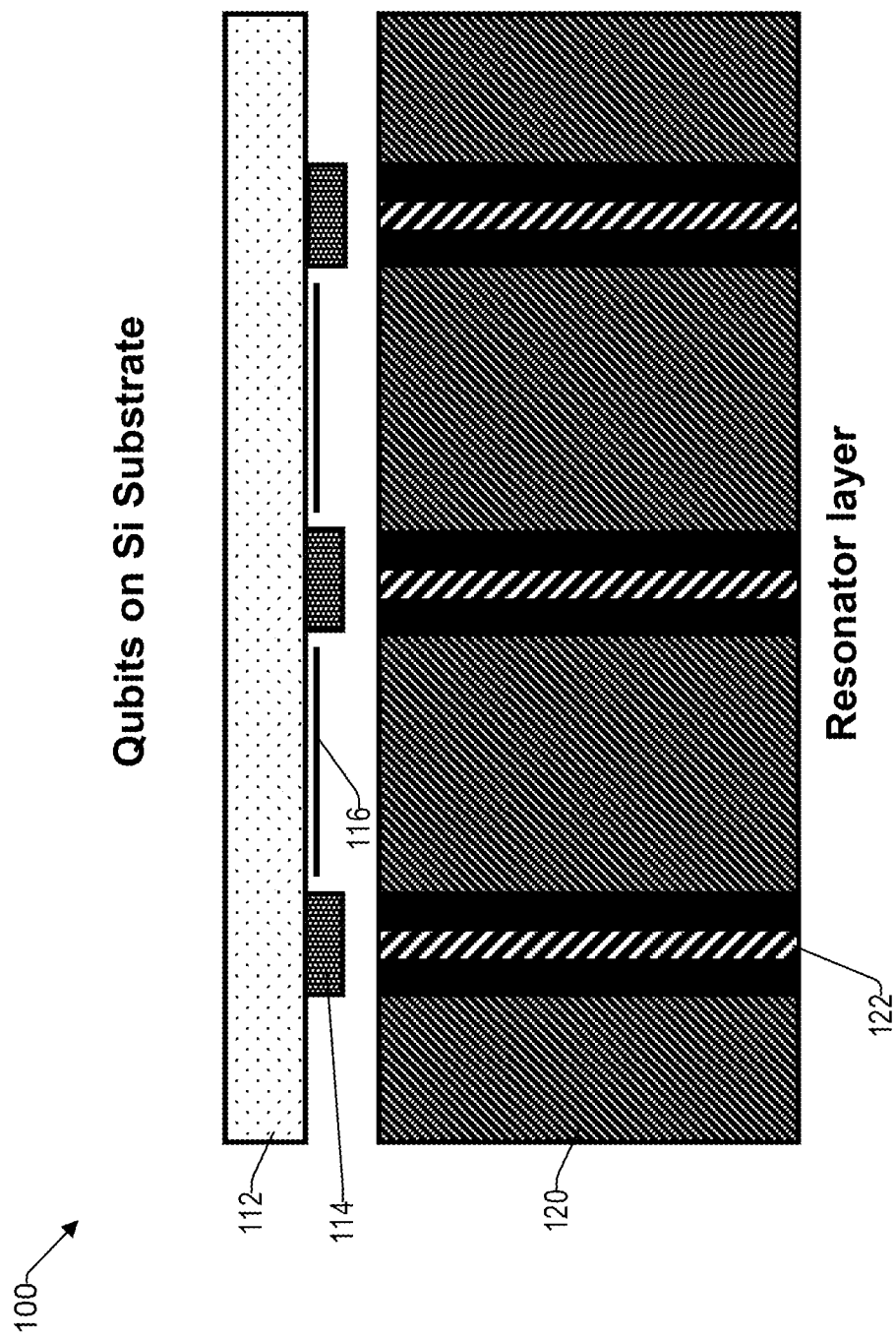
FIG. 1A is a simplified cross-section view of an example qubit on silicon substrate that provides coaxial readout resonators.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, spatially related terminology such as "front," "back," "top," "bottom," "beneath," "below," "lower," above," "upper," "side," "left," "right," and the like, is used with reference to the orientation of the Figures being described. Since components of embodiments of the disclosure can be positioned in a number of different orientations, the directional terminology is used for purposes of illustration and is in no way limiting. Thus, it will be understood that the spatially relative terminology is intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

As used herein, the terms "lateral" and "horizontal" describe an orientation parallel to a first surface of a chip.

As used herein, the term "vertical" describes an orientation that is arranged perpendicular to the first surface of a chip, chip carrier, or semiconductor body.

As used herein, the terms "coupled" and/or "electrically coupled" are not meant to mean that the elements must be directly coupled together—intervening elements may be provided between the "coupled" or "electrically coupled" elements. In contrast, if an element is referred to as being "directly connected" or "directly coupled" to another element, there are no intervening elements present. The term "electrically connected" refers to a low-ohmic electric connection between the elements electrically connected together.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Example embodiments are described herein with reference to cross-sectional illustrations that are schematic illustrations of idealized or simplified embodiments (and intermediate structures). As such, variations from the shapes of the illustrations as a result, for example, of manufacturing techniques and/or tolerances, may be expected. Thus, the regions illustrated in the figures are schematic in nature and their shapes do not necessarily illustrate the actual shape of a region of a device and do not limit the scope.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

As used herein, certain terms are used indicating what may be considered an idealized behavior, such as, for example, "lossless," "superconductor," or "superconducting," which are intended to cover functionality that may not be exactly ideal but is within acceptable margins for a given application. For example, a certain level of loss or tolerance may be acceptable such that the resulting materials and structures may still be referred to by these "idealized" terms.

The concepts herein relate to quantum technology and quantum chips. Regarding quantum technology, the electromagnetic energy associated with a qubit can be stored, for example, in so-called Josephson junctions and in the capacitive and inductive elements that are used to form the qubit. In other examples, there may be spin qubits coupled to resonators or topological qubits, microfabricated ion traps, etc. Other types of superconducting components are supported by the teachings herein as well, including (without limitation), circulators, isolators, mixers, amplifiers, filters, active control electronics such as rapid single flux quantum (RSFQ), etc.

As used herein, a transmon is a type of superconducting charge qubit. The term transmon is an abbreviation of transmission line shunted plasma oscillation qubit, which includes of a Cooper-pair box. It typically exhibits less sensitivity to charge noise, while maintaining a sufficient anharmonicity for selective qubit control.

In one example, to read out the qubit state, a microwave signal is applied to the microwave readout cavity that couples to the qubit at the cavity frequency. The transmitted (or reflected) microwave signal goes through multiple thermal isolation stages and low-noise amplifiers (LNAs) that are used to block or reduce the noise and improve the signal-to-noise ratio. Alternatively, or in addition, a microwave signal (e.g., pulse) can be used to entangle one or more qubits.

The amplitude and/or phase of the returned/output microwave signal carries information about the qubit state, such as whether the qubit has dephased to the ground or excited state. The microwave signal carrying the quantum information about the qubit state is usually weak (e.g., on the order of a few microwave photons). To measure this weak signal with room temperature electronics (i.e., outside a refrigerated environment), low-noise quantum-limited amplifiers (QLAs), such as Josephson amplifiers and travelling-wave parametric amplifiers (TWPAs), may be used as preamplifiers (i.e., first amplification stage) at the output of the quantum system to boost the quantum signal, while adding the minimum amount of noise as dictated by quantum mechanics, in order to improve the signal to noise ratio of the output chain. In addition to Josephson amplifiers, certain Josephson microwave components that use Josephson amplifiers or Josephson mixers such as Josephson circulators, Josephson isolators, and Josephson mixers can be used in scalable quantum processors. Accordingly, Josephson junctions are salient circuit elements of a superconducting quantum computer. A Josephson junction may include a thin layer of insulator, sometimes referred to as a barrier or a tunnel barrier, between two layers of superconductor. The Josephson junction acts as a superconducting tunnel junction.

Materials to make the interconnects include, without limitation, niobium (Nb), aluminum (Al), niobium nitride (NbN), titanium nitride (TiN), niobium titanium nitride (NbTiN), etc., sometimes referred to herein as superconductors. It will be understood that other suitable materials that have superconducting properties can be used as well.

The states of the qubits in a quantum computer can be described using wave functions, which are mathematical representations of the quantum state of the system. Coherence is present in a quantum computing system when a phase relation exists between the states of the quantum computer, such as a phase relation between the quantum wave functions that describes the qubit states. Quantum computers rely on coherence to operate. A loss of quantum coherence relates to a loss of information to the outside environment and is destructive to the computations being performed. Coherence can be maintained by isolation of the qubits in the quantum computer from outside noise, such as thermal interactions and electromagnetic interactions, cause the coherence of the system to degrade in a process called quantum decoherence. Thus, quantum decoherence can be interpreted as the loss of information from the quantum system into its surrounding environment.

While some forms of coupling in qubits, such as thermal coupling, can be addressed by isolation of the quantum computer from its environment, for example mechanical vibration isolation and thermal isolation, other forms of coupling, such as electromagnetic coupling, can be more challenging. One form of electromagnetic coupling arises from charge noise, which is difficult to shield. Charge fluctuations occur constantly in most materials, as the electrons in their orbits around atoms cause ephemeral regions of relatively positive and negative charge. This charge noise arises from the materials themselves and couples electromagnetically with the atoms of the qubits. Charge noise can thus cause decoherence to occur, as the electromagnetic interactions cause unpredictable changes to the states of the qubits.

In one aspect, the time that it takes for decoherence to occur is a measure of the viability of a quantum computing architecture. Larger objects generally decohere very quickly, as they have many interactions with their surrounding environments. The longer a quantum computer can maintain coherence, the more feasible it is to perform useful computations with that quantum computer. Finding ways to delay decoherence is therefore salient in the realm of quantum computing.

The teachings herein provide structures that are resilient against quantum decoherence. Vertical resonators and vertical transmon structures are used that facilitate a high qubit density. The techniques described herein may be implemented in a number of ways. Example implementations are provided below with reference to the following figures.

Example Superconducting Transistor Structures

Reference now is made to FIG. 1A, which is a simplified cross-section view of an example qubit on silicon substrate that provides coaxial readout resonators. A quantum chip 112 is shown in reference to a chip carrier 120. In some embodiments, the quantum chip 112 is physically mounted to the chip carrier by posts or some other structure to maintain a gap between the two, while in other embodiments the two structures are held apart. The quantum chip 112 carries a set of qubits 114 that are included in the chip 112 and that communicate with one another by quantum buses 116.

For example, the chip carrier 120 is formed from a grounded conductor or superconductor and has vertical resonators 122 formed within it in positions that correspond to the positions of qubits 114. While coaxial resonator structures are used herein by way of example, it will be understood that any appropriate resonator structure can be used instead. A coaxial structure can suppress microwave radiation and provides a high-Q resonator, while the surrounding, grounded bulk material protects the qubits 114 from environmental noise and thermal radiation. Such isolation prevents interference between readout resonators and prevents the readout resonators from interfering with the function of the quantum buses 116.

The resonators 122 capacitively couple with their respective qubits 114 across an air gap or some appropriate dielectric barrier. The height of the air gap can be any appropriate size. The quantum buses 116 enable quantum operations between the qubits 114 that they connect. A "quantum operation" represents an instruction or a command to be applied to one or more quantum qubits, or a combination of instructions or commands in a programming language for quantum computing. For example, a "quantum operation" may represent a quantum gate, or a combination of quantum gates that can be treated as a single function. In some embodiments, the quantum buses can be directional or non-directional.

Figure 1B:
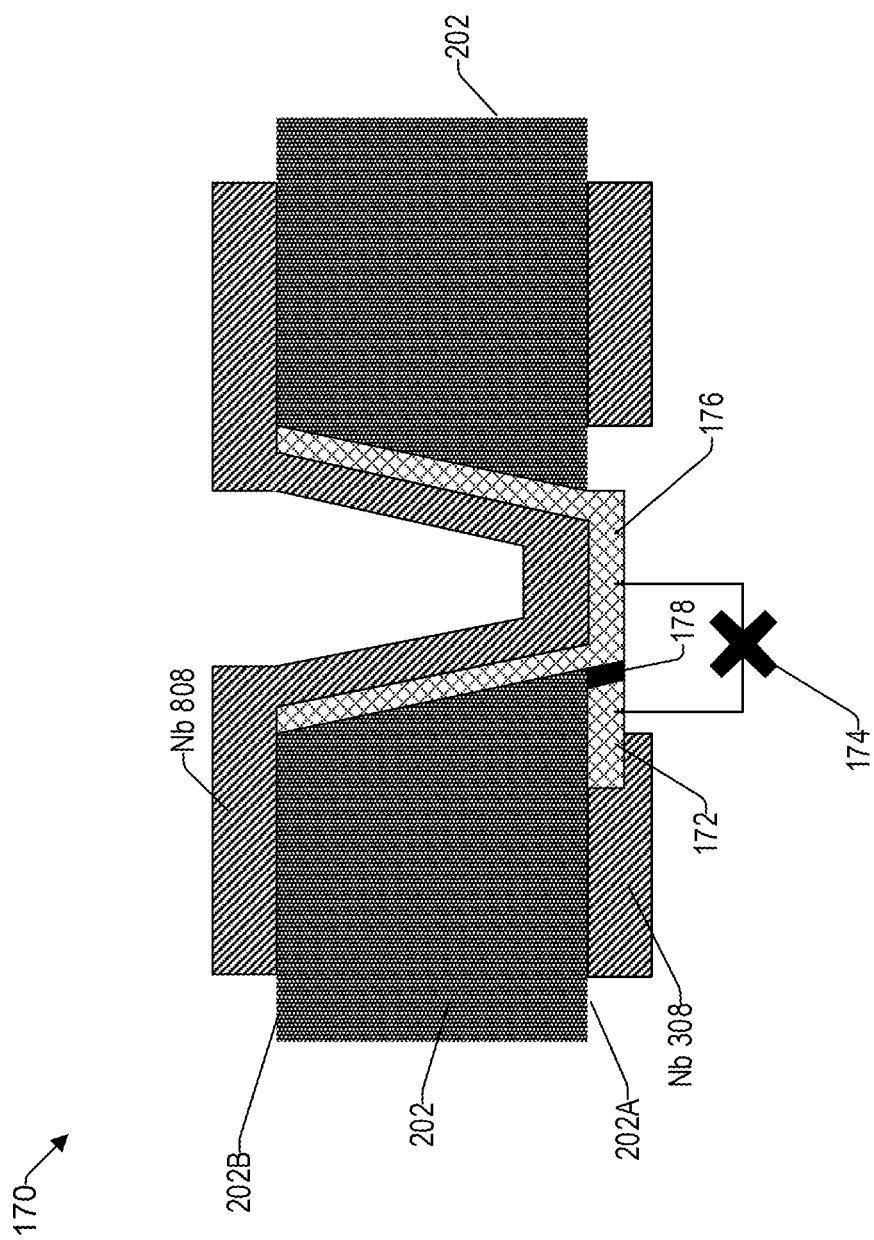
FIG. 1B is a cross-section view of transmon qubit structure, consistent with an illustrative embodiment.

Reference now is made to FIG. 1B, which is a cross-section view of transmon qubit structure 170, consistent with an illustrative embodiment. The qubit structure 170 includes a substrate 202 having a first surface 202A and a second surface 202B. There is a through-silicon-via (TSV) 808 located in the substrate 202. There is a first electrode 172 of a Josephson junction (JJ) 174 located on a portion of the first surface 202A of the substrate 202 and adjacent to the TSV 808. A second electrode 176 of the JJ 174 is in contact with the TSV 808. The first electrode 172 is separate from the second electrode 176 by an insulator 178. The creation of the semiconductor structure of FIG. 1B is discussed in detail below.

Example Processes for Qubit Structures

Figure 2:
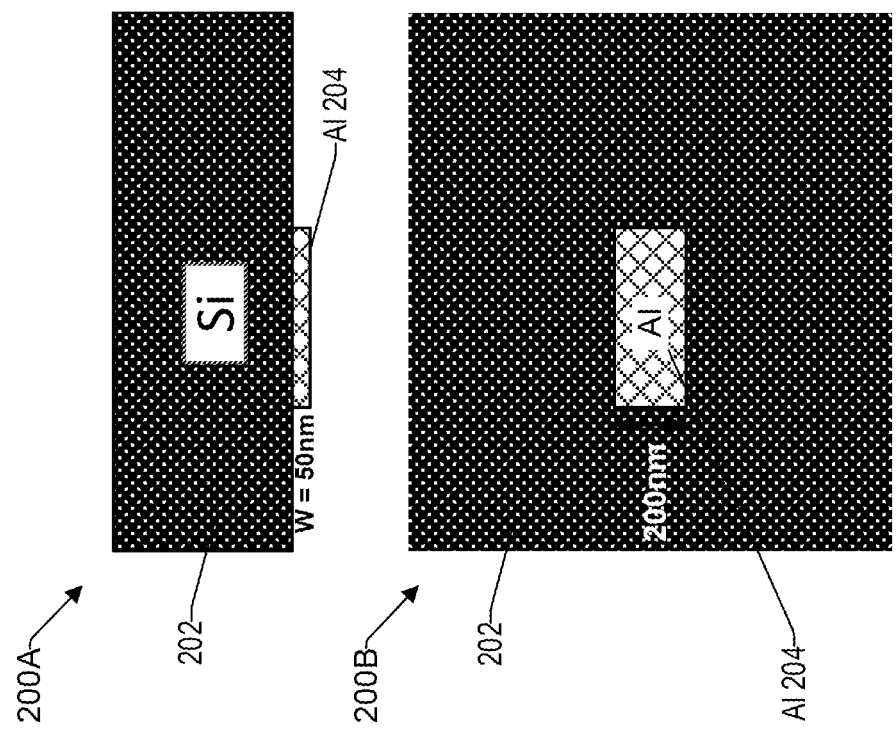
FIG. 2 illustrates a cross-section view and a bottom view of a semiconductor structure, consistent with an illustrative embodiment.

With the foregoing description of an example qubit semiconductor structure 170, it may be helpful to discuss an example process of manufacturing the same. To that end, FIGS. 2 to 13 illustrate various steps in the manufacture of a superconductor structures, consistent with illustrative embodiments. More specifically, FIG. 2 illustrates a cross-section view 200A and a bottom view 200B of a semiconductor structure. In one embodiment, the semiconductor structure has a silicon substrate 202. In various embodiments, the substrate 202, may comprise any suitable material or combination of materials, such as doped or undoped silicon, glass, dielectrics, etc. For example, the substrate may comprise a semiconductor-on-insulator (SOI) structure, e.g., with a buried insulator layer, or a bulk material substrate, e.g., with appropriately doped regions, typically referred to as wells. In another embodiment, the substrate may be silicon with silicon oxide, nitride, or any other insulating films on top.

Other materials that may be used for the substrate include, without limitation, sapphire, aluminum oxide, germanium, gallium arsenide (GaAs) or any of the other III-V periodic table compounds, indium phosphide (InP), silicon carbide (SiC), a superconducting alloy of silicon and germanium, quartz, etc. Thus, as used herein, the term substrate 202 refers to a foundation upon which various superconducting structures can be built.

There is a deposition of aluminum (Al) 204 on a bottom surface of the substrate 202. The deposition of Al 204 may be by way of E-beam deposition and plasma dry etch or liftoff, or selective deposited by atomic layer deposition (ALD). In one embodiment, the vertical width of the Al 204 is 50 nm and the thickness (i.e., depth) is 200 nm.

Figure 3:
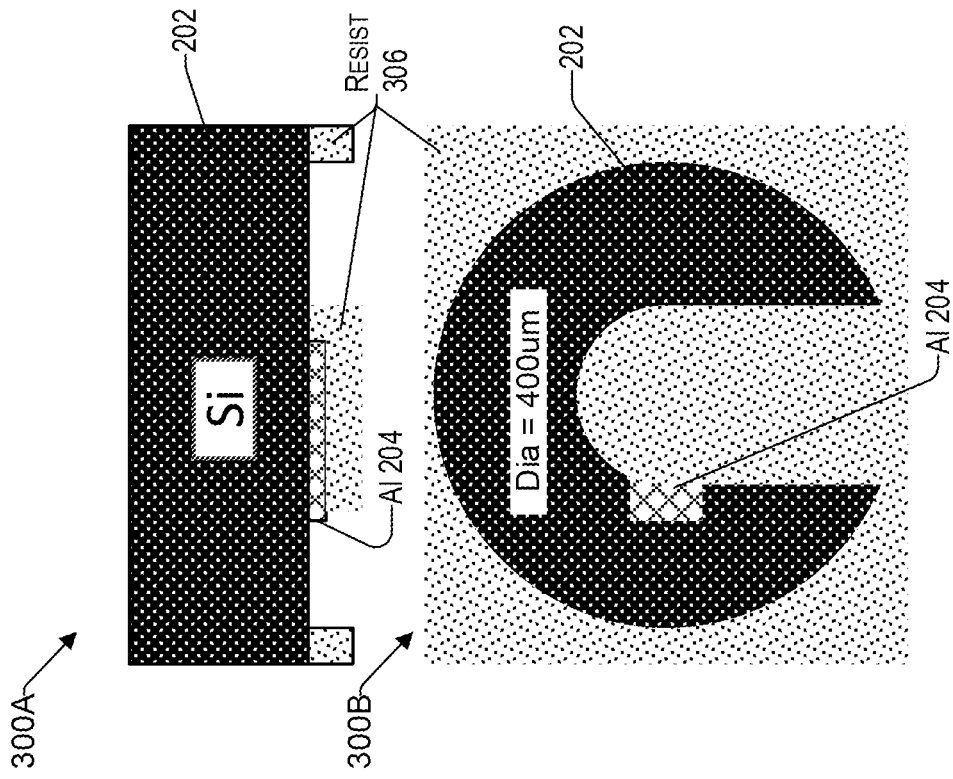
FIG. 3 provides a cross-section view and a bottom view of a semiconductor structure with a photoresist patterning, consistent with an illustrative embodiment.

FIG. 3 provides a cross-section view 300A and a bottom view 300B of a semiconductor structure with a photoresist 306 patterning, consistent with an illustrative embodiment. More specifically, the photoresist 306 is provided on the bottom side of the semiconductor structure 300A. For example, as is understood by those of ordinary skill in the art, a mask layer (not shown), sometimes referred to as a photomask, may be provided by forming a layer of photoresist material on the Si 202 layer and Al layer 204, exposing the photoresist material to a pattern of light, and developing the exposed photoresist material. In one embodiment, the inner portion of the photoresist is slightly bigger than that for the through silicon via (TSV), discussed in more detail later. The inner and outer portions are linked for easy removal. In one embodiment, the Al portion should not be fully covered with the photoresist so that the Al is contacted with the Nb layer in a later step. The diameter of the resulting exposed Si can be approximately 400 um. The width of the resist 306 may be 5 um.

Figures 4, 5:
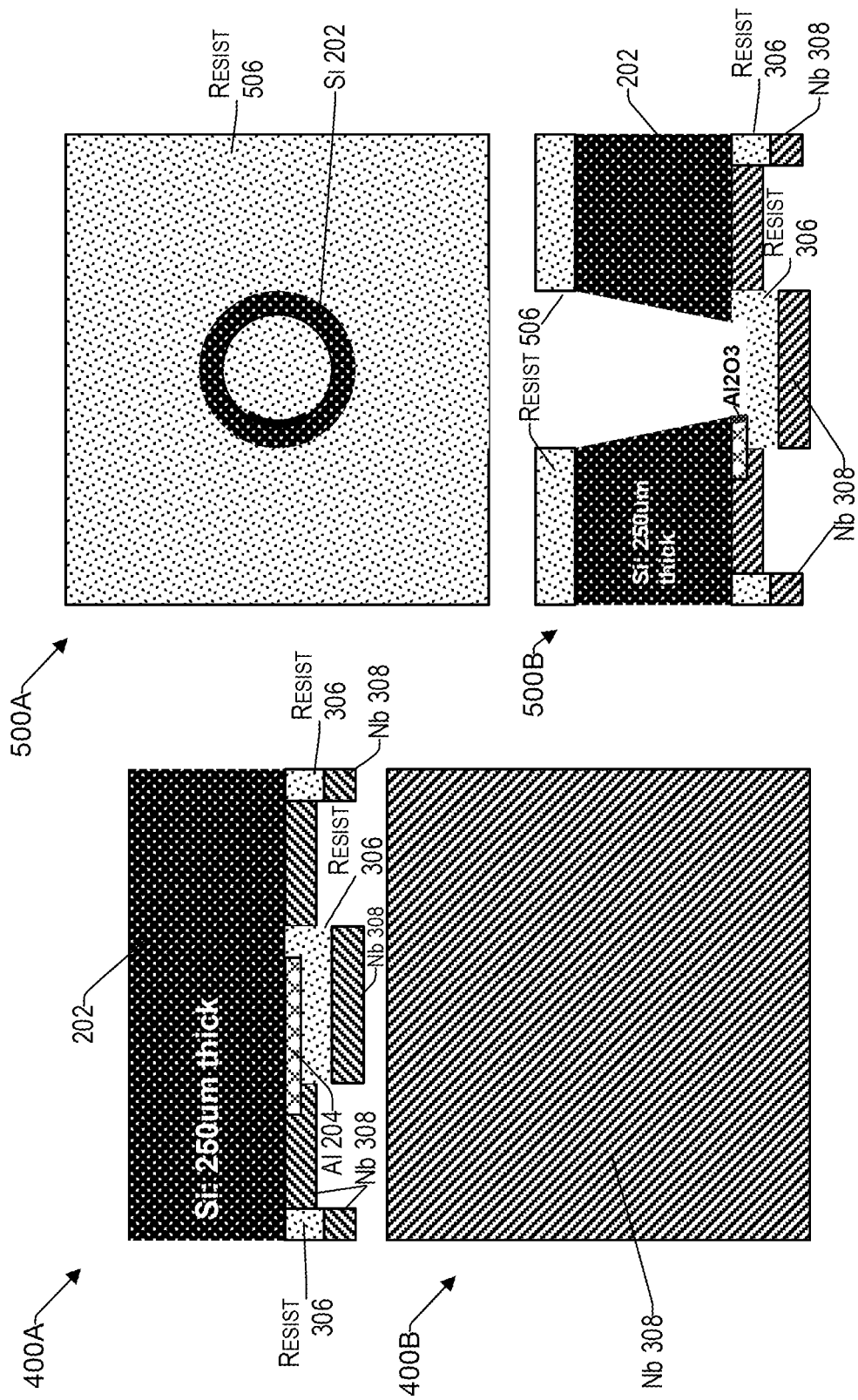
FIG. 4 provides a cross-section view and a bottom view of a semiconductor structure with a coating of niobium (Nb), consistent with an illustrative embodiment.
FIG. 5 provides a top view and a cross-section view of a semiconductor structure with a photoresist pattern on the upper side of the semiconductor structure, consistent with an illustrative embodiment.

FIG. 4 provides a cross-section view 400A and a bottom view 400B of a semiconductor structure with a coating of niobium (Nb) 308, consistent with an illustrative embodiment. In one embodiment, ion milling is used to remove the natural oxide on the Al 204. For example, Ion milling can be applied on the Al for removing the natural oxide at the boundary with the Nb for good Al—Nb contact. Sputtering may be used for depositing 400 um diameter plate, covering the resist 306 and Si 202 with a thickness of 100 nm of Nb. The parallel plate capacitance introduced by the Nb layer 308 can have a capacitance of 50 fF.

FIG. 5 provides a top view 500A and a cross-section view 500B of a semiconductor structure with a photoresist pattern 506 on the upper side (i.e., top surface) of the semiconductor structure, consistent with an illustrative embodiment. As illustrated in FIG. 500B, the TSV can be created by etching. In one embodiment, there is a 85% Argon (Ar) and 15% Oxygen (O2) mix (Oxidation).

Figure 6:
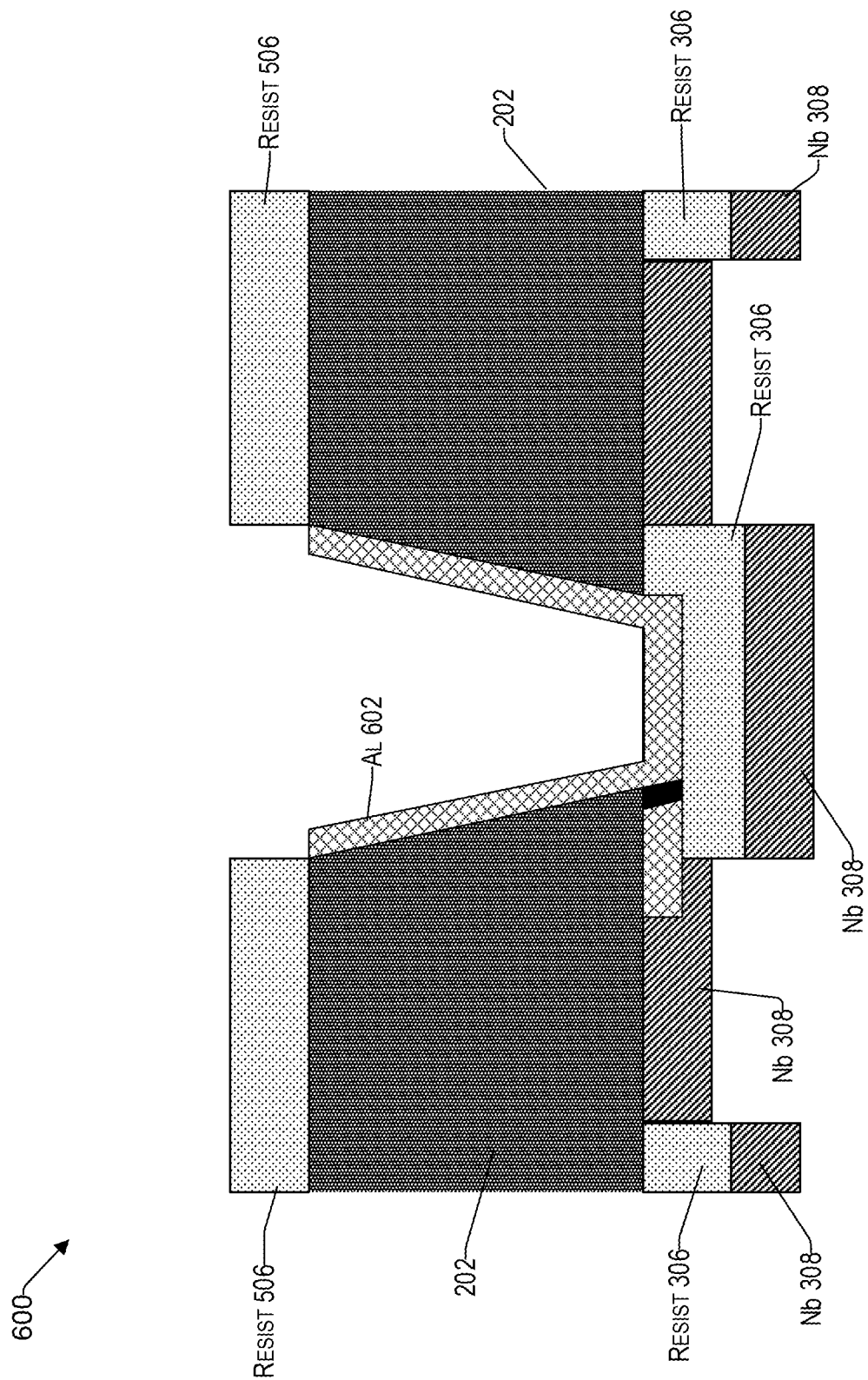
FIG. 6 provides a cross-section view of a vertical transmon having a deposition of aluminum within the through silicon via (TSV), consistent with an illustrative embodiment.

Next in the process in fabricating the vertical transmon is a deposition of aluminum 602 within the TSV, as illustrated in the semiconductor structure 600 of FIG. 6. In various embodiments, the Al 602 is deposited by way of E-beam deposition or ALD.

Figure 7:
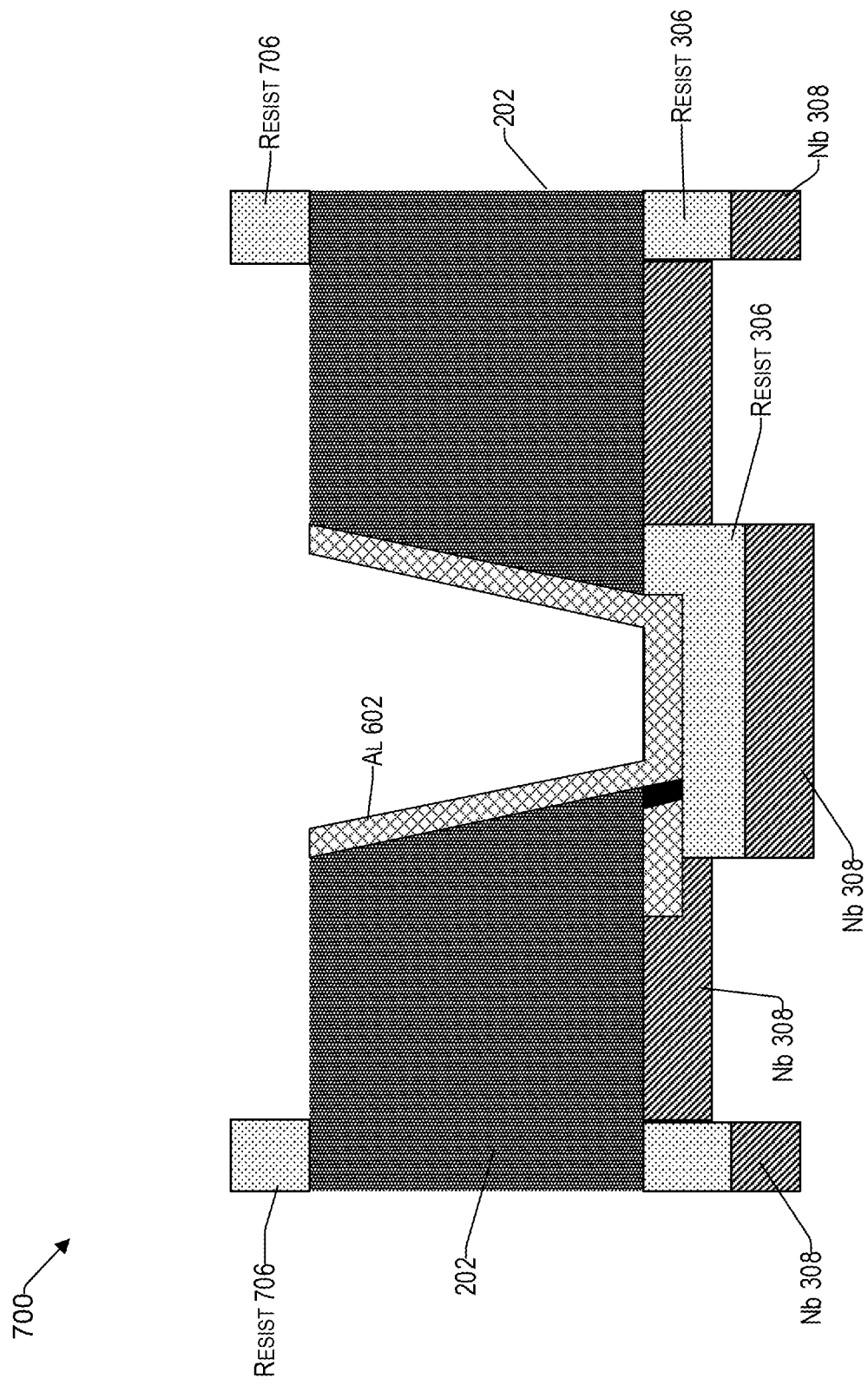
FIG. 7 provides a cross-section view of a semiconductor structure where portions of the top resist are removed, consistent with an illustrative embodiment.

FIG. 7 provides a cross-section view 700 of a semiconductor structure where portions of the top resist 506 are removed, consistent with an illustrative embodiment. In one embodiment, a dry etching process, such as a reactive ion etch (RIE) can be used and another resist layer 706 applied.

Figure 8:
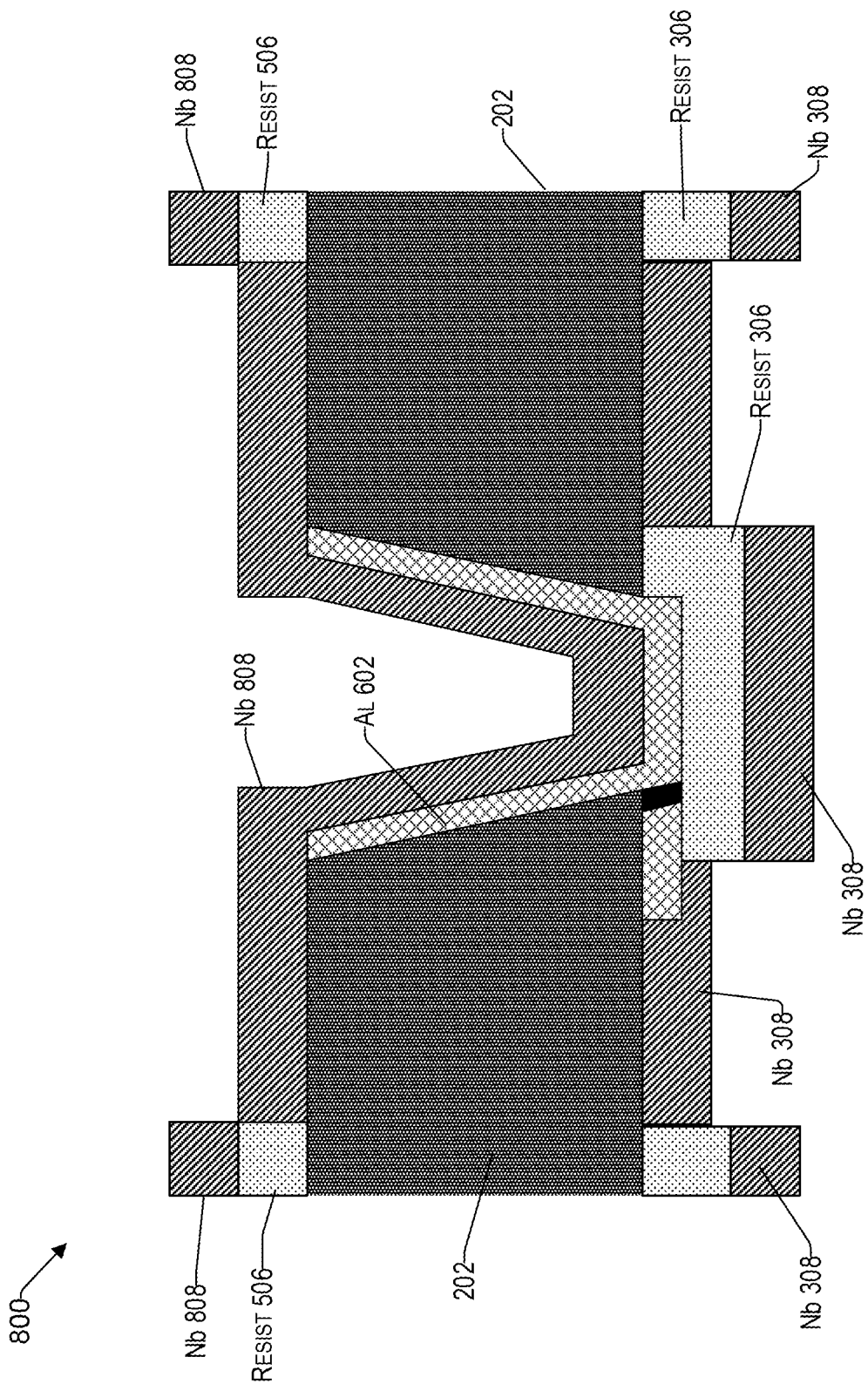
FIG. 8 provides a cross-section view of a semiconductor structure that includes a Niobium layer on its top surface, consistent with an illustrative embodiment.

FIG. 8 provides a cross-section view 800 of a semiconductor structure that includes an Nb layer 808 on its top surface, consistent with an illustrative embodiment. To that end, ion milling can be used for first removing any natural oxide on the surface of the Al layer 602. Nb 808 can then be deposited by way of sputtering.

Figure 9:
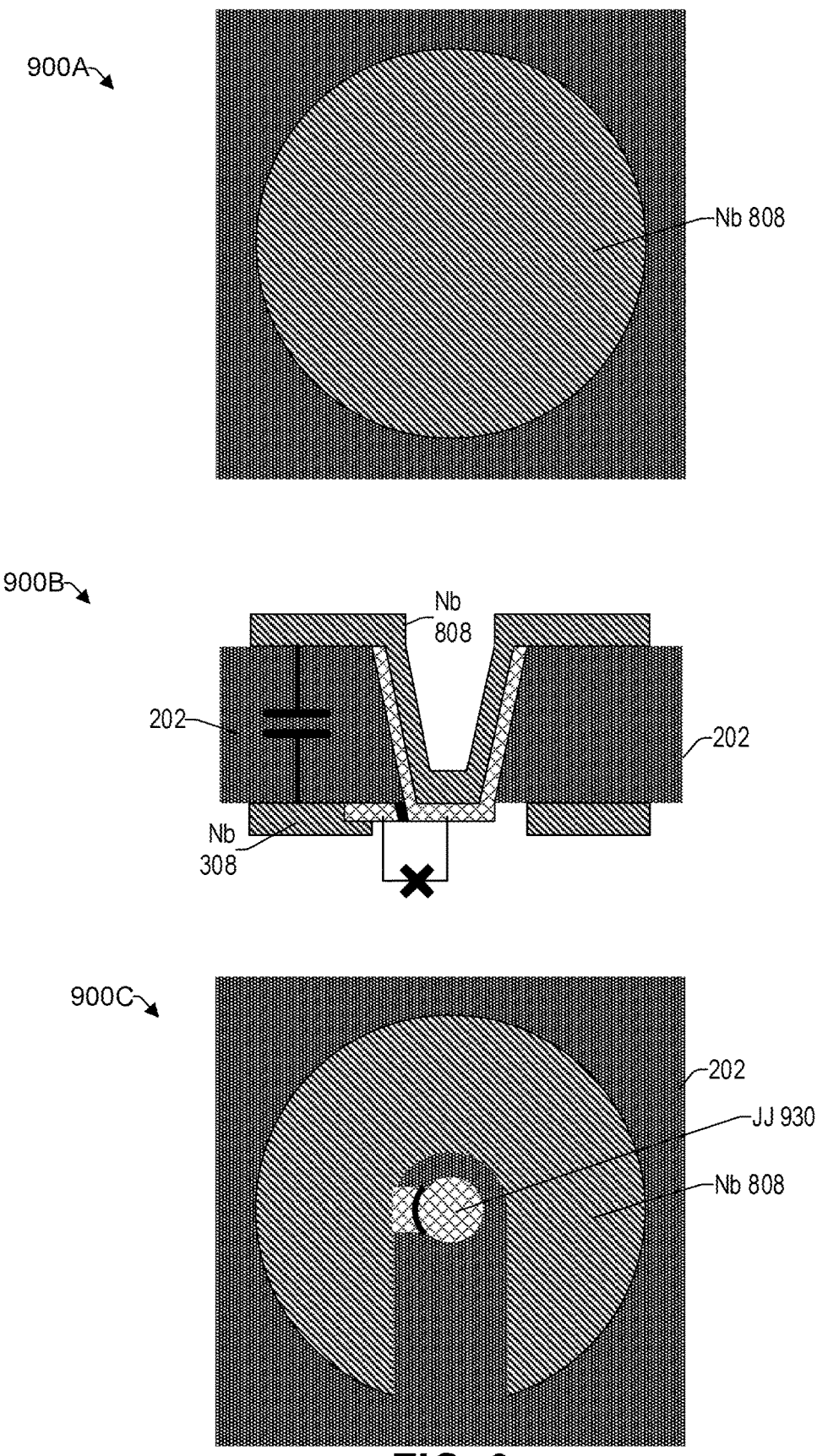
FIG. 9 provides a top view, a cross-section view, and a bottom view of a semiconductor structure after a photo resist has been removed, consistent with an illustrative embodiment.

FIG. 9 provides a top view 900A, a cross-section view 900B, and a bottom view 900C of a semiconductor structure after a photo resist has been removed, consistent with an illustrative embodiment. As illustrated in the bottom view 900C, the JJ 930 has removed therefrom the Nb and photoresist layers immediately below it. The first photoresist layers 306 and the second photoresist layer 506 is deposited concurrently. The parallel plate capacitance between the Nb layers 308 and 808 can have a capacitance of 50 fF, sometimes referred to herein as the shunting capacitor. The shunting capacitor 920 plates for the transmon structure 900B can be asymmetrical to the vertical resonator. Stated differently, the vertical width of the top plate (e.g., Nb 808) can be longer than the lateral width of the bottom plate (e.g., Nb 308).

The process described in the context of FIGS. 2 to 9 can have a right angle deposition instead of a double angle deposition, which enables qubit fabrication on an entire wafer. The resulting semiconductor structure 900B can advance the scaling of the number of qubits. In contrast, a conventional Josephson junction is fabricated by a double angle deposition, where a first aluminum layer is deposited with an angle (not vertical direction), oxidized, then a second aluminum layer is deposited with a different angle. The Si wafer is tilted with a different angle in two deposition steps, so Josephson junctions cannot be fabricated on an entire wafer. By virtue of the teachings herein, a Josephson junction can be constructed with an aluminum deposition from vertical direction so that they can be fabricated on an entire wafer.

Figure 10A:
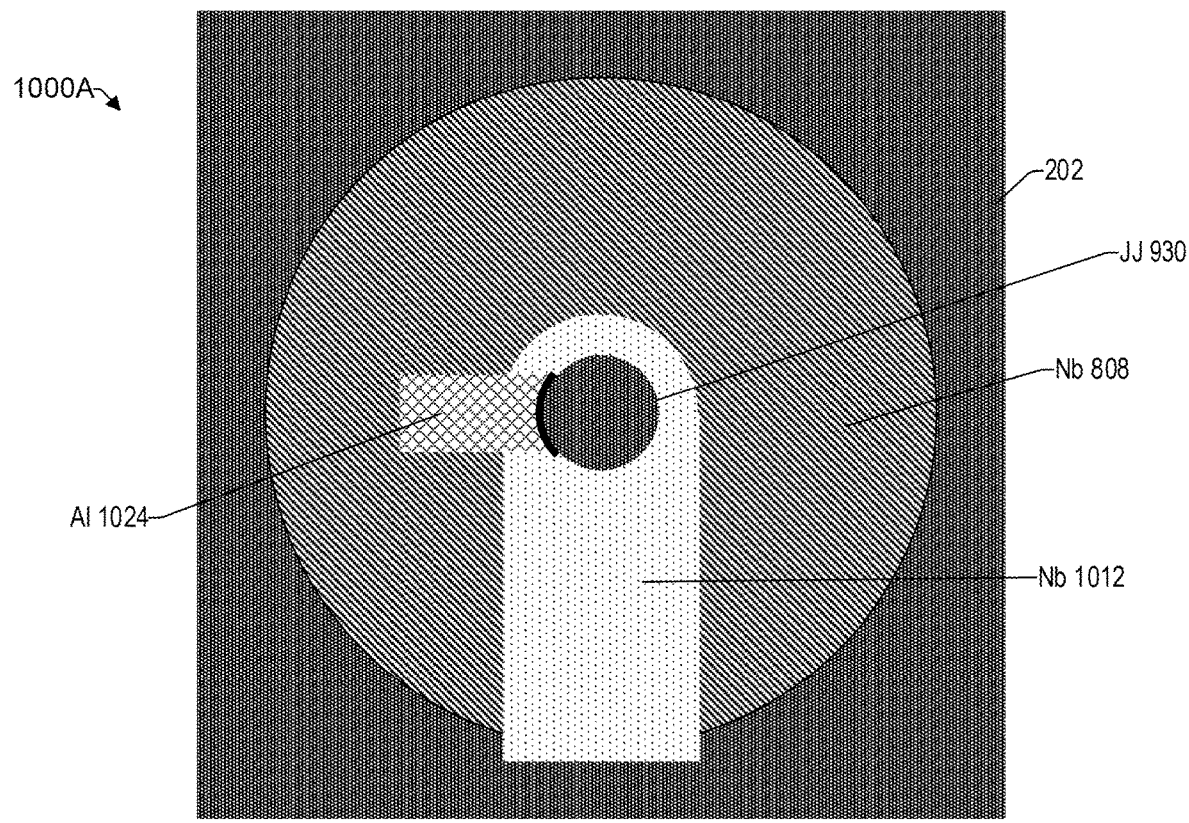
FIGS. 10A and 10B provide a top view and a cross-section views, respectively, of a semiconductor structure that is a continuation of the processing of the semiconductor structure of, consistent with an illustrative embodiment.
Figure 10B:
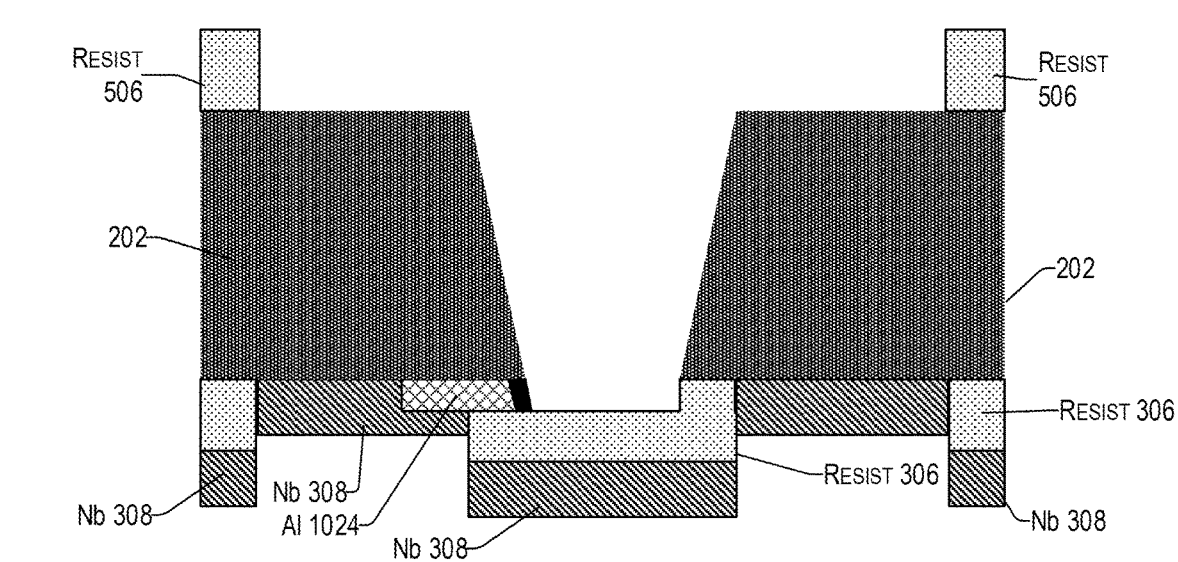

Reference now is made to another process of manufacturing a transmon qubit structure. The process steps described in the context of FIGS. 2 to 4 are substantially similar and are therefore not repeated here for brevity. The main difference being that the first photoresist layer 308 on the bottom and second photoresist layer 506 on top, are deposited at a same stage. FIG. 10 provides a top view 1000A and a cross-section view 1000B of a semiconductor structure that is a continuation of the processing of the semiconductor structure of FIG. 4, consistent with an illustrative embodiment. More specifically, as illustrated in FIG. 1000B, the TSV can be created by etching. In one embodiment, there is an 85% Ar and 15% O2 mix (Oxidation). In the embodiment of FIG. 10A, the Aluminum Al 1024 does not extend into the TSV.

Figure 11:
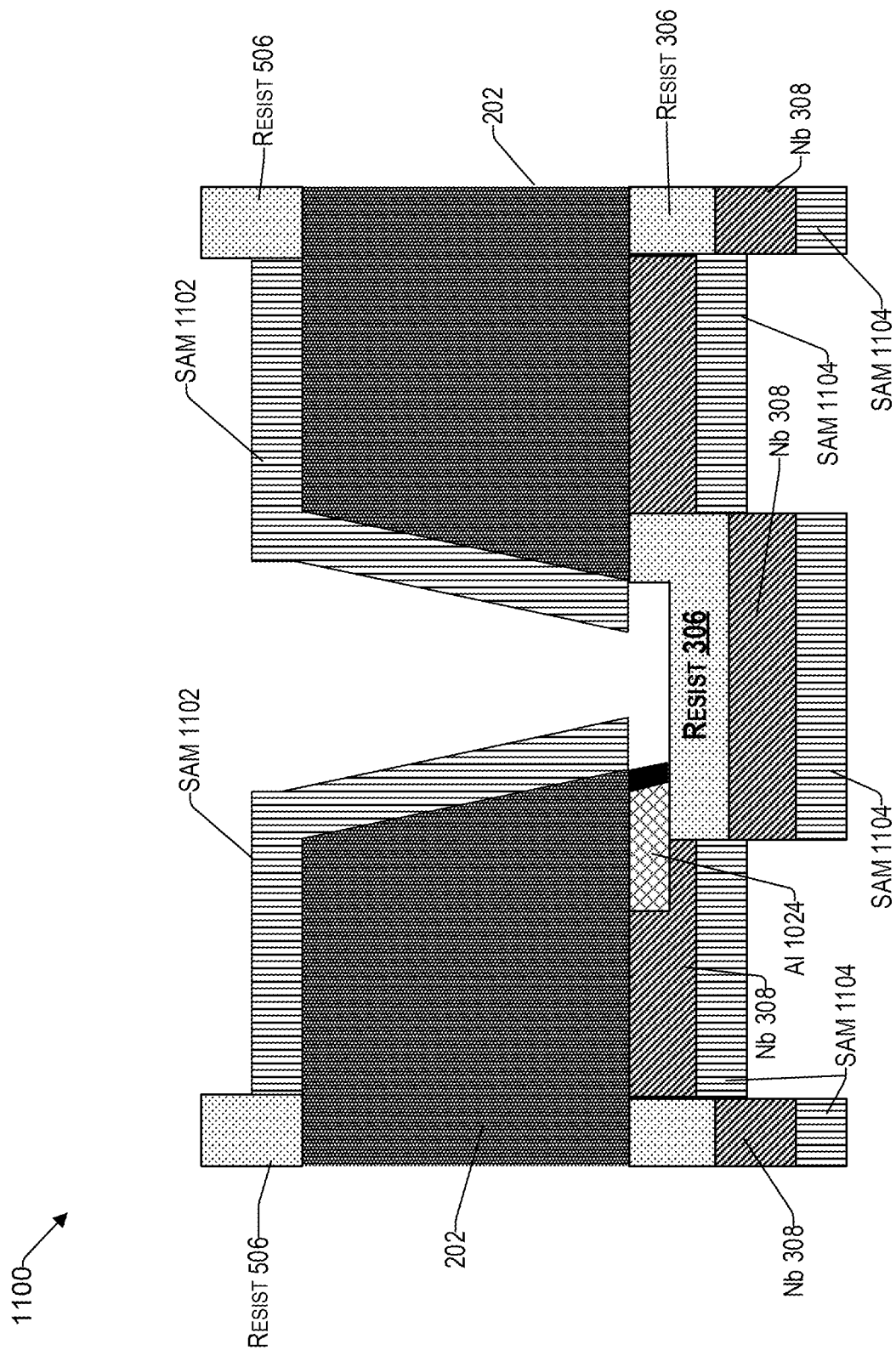
FIG. 11 is a cross-section view of a semiconductor structure having a self-assembled monolayer (SAM) of a photoresist on the top and the bottom of the semiconductor structure, consistent with an illustrative embodiment.

FIG. 11 is a cross-section view of a semiconductor structure 1100 having a self-assembled monolayer (SAM) of a photoresist on the top 1102 and the bottom 1104 of the semiconductor structure 1100, consistent with an illustrative embodiment. For example, the SAM can be a one molecule thick layer of material that bonds to a surface (e.g., substrate 202 and Nb 308) in an ordered way as a result of physical or chemical forces during a deposition process.

Figure 12:
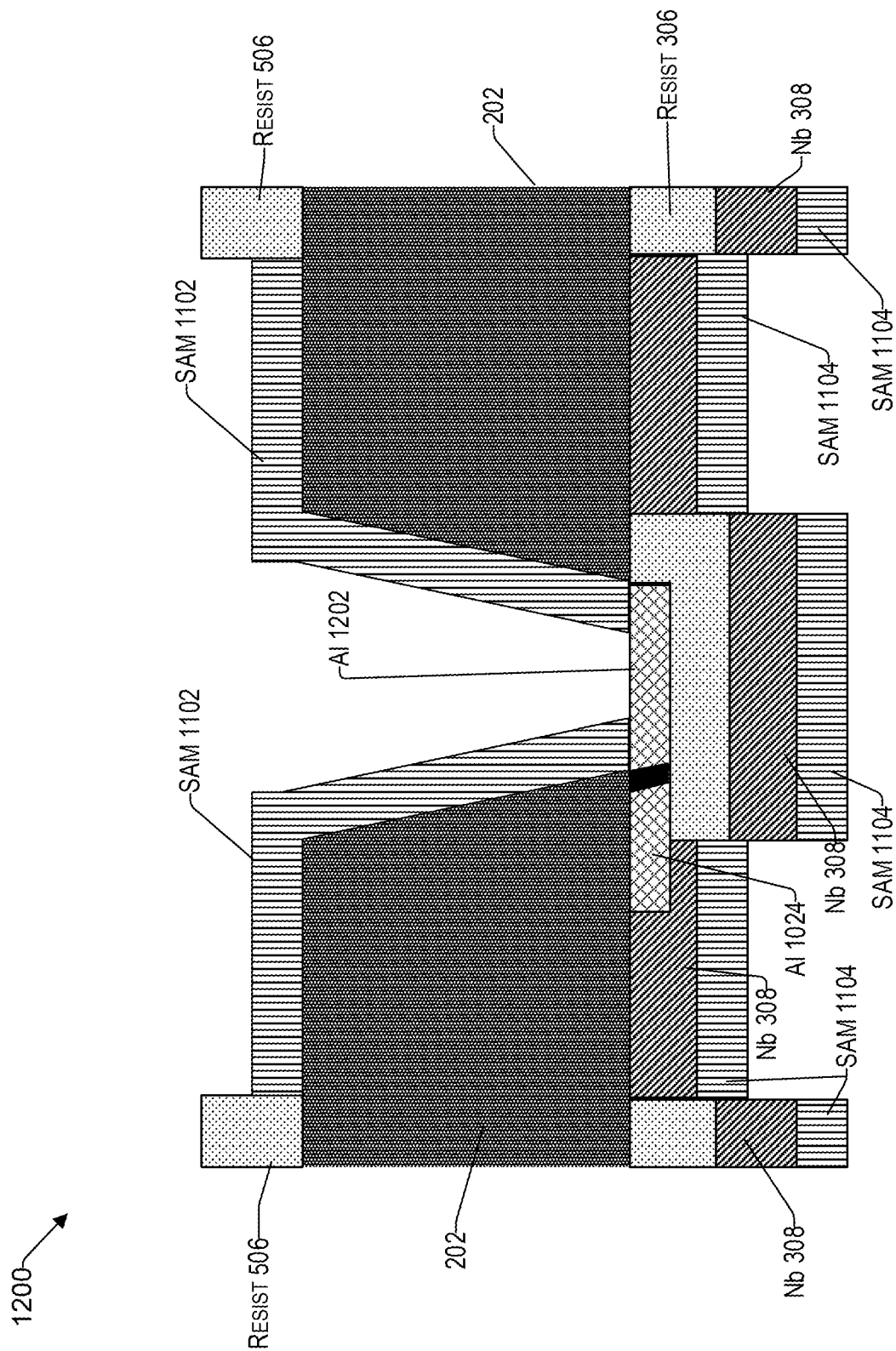
FIG. 12 is a cross-section view of a semiconductor structure having a deposition of aluminum (Al) at a base of the TSV, consistent with an illustrative embodiment.

FIG. 12 is a cross-section view of a semiconductor structure 1200 having a deposition of Al 1202 at a base of the TSV, consistent with an illustrative embodiment. In one embodiment, the deposition of the Al is by way of selective ALD.

Figure 13:
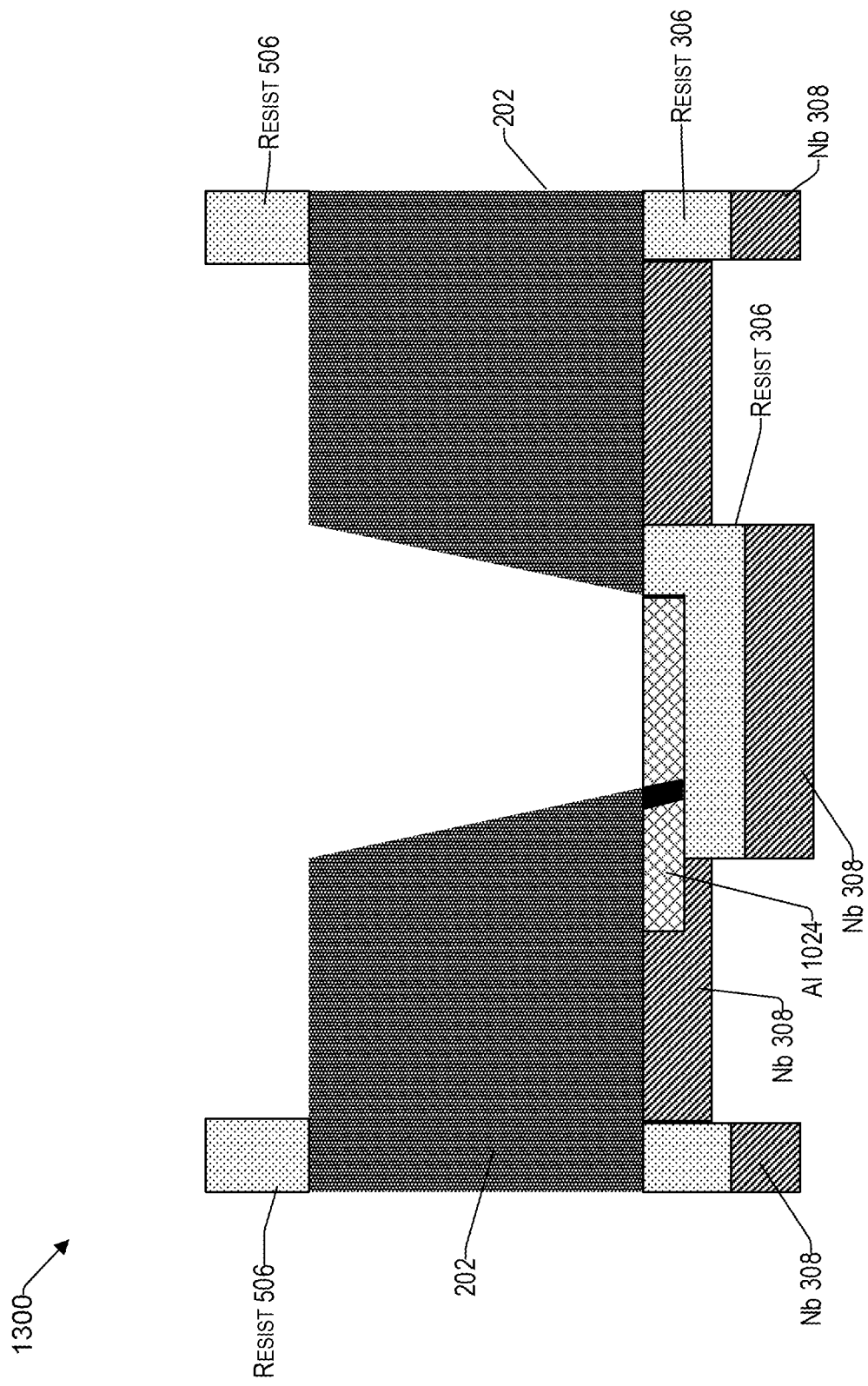
FIG. 13 is a cross-section view of a semiconductor structure where the self-assembled monolayer is removed from both the bottom and the top surface of the semiconductor structure, consistent with an illustrative embodiment.
Figure 14:
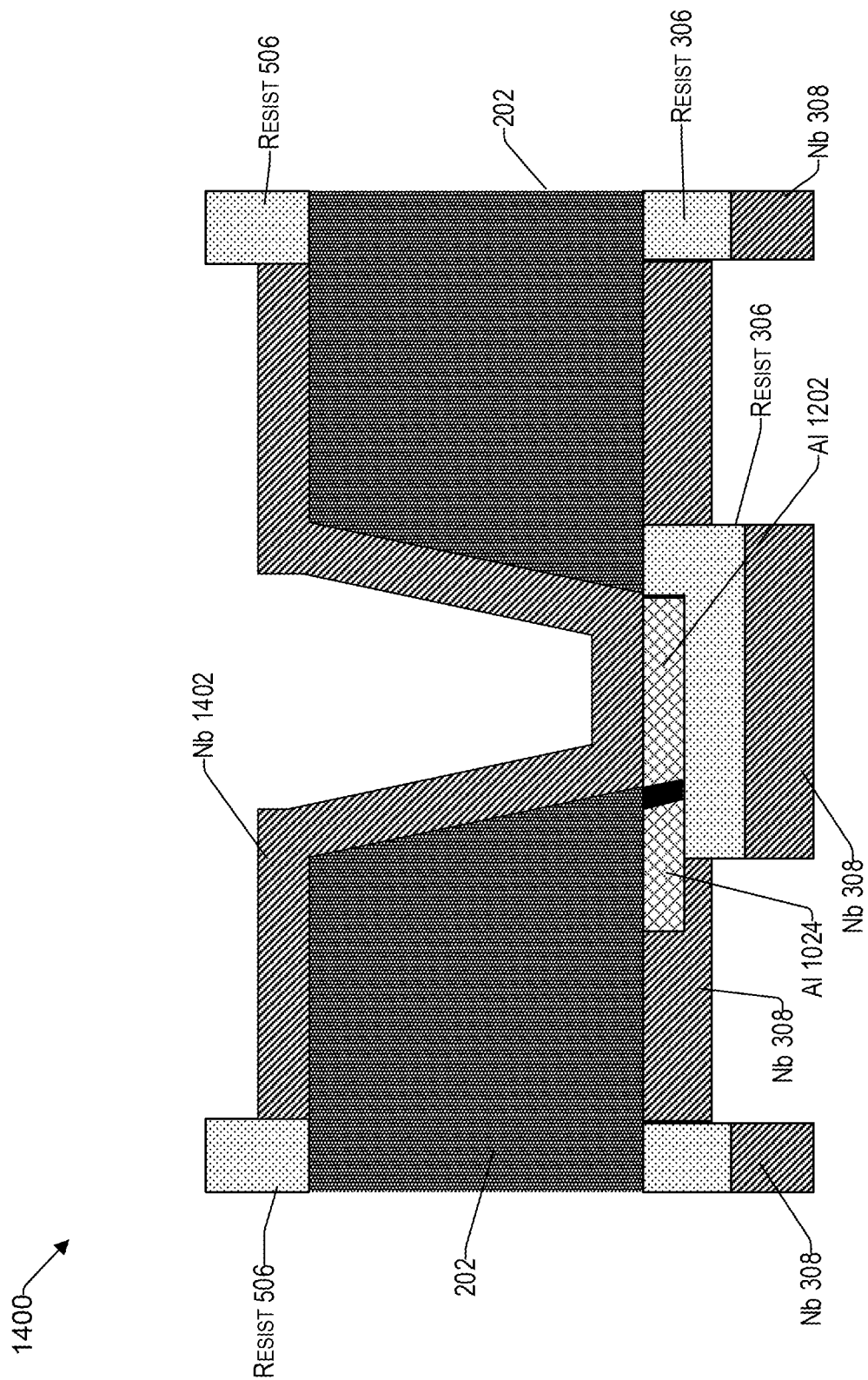
FIG. 14 illustrates a semiconductor structure having a deposition of niobium Nb deposited on its top surface, consistent with an illustrative embodiment.

FIG. 13 is a cross-section view of a semiconductor structure 1300 where the SAM is removed from both the bottom and the top surface of the semiconductor structure 1300, consistent with an illustrative embodiment. Instead of the SAM, a layer of Nb 1402 is deposited on the top surface of the semiconductor structure 1400, as depicted in FIG. 14. In one embodiment, prior to depositing the layer of NB 1402 on the top surface of the semiconductor structure 1400, ion milling is performed to remove any natural oxide on the aluminum layer 1202. The Nb layer 1402 may itself be deposited by sputtering.

Figure 15A:
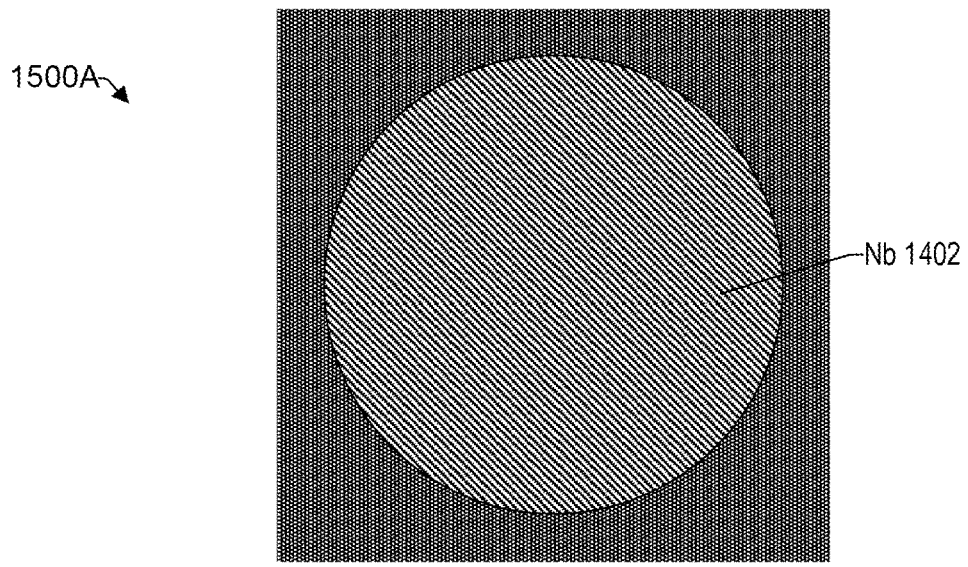
FIGS. 15A, 15B, and 15C provide a top view, a cross-section view, and a bottom view, respectively, of a semiconductor structure after a photo resist and of FIG. 14 has been removed, consistent with an illustrative embodiment.
Figure 15B:
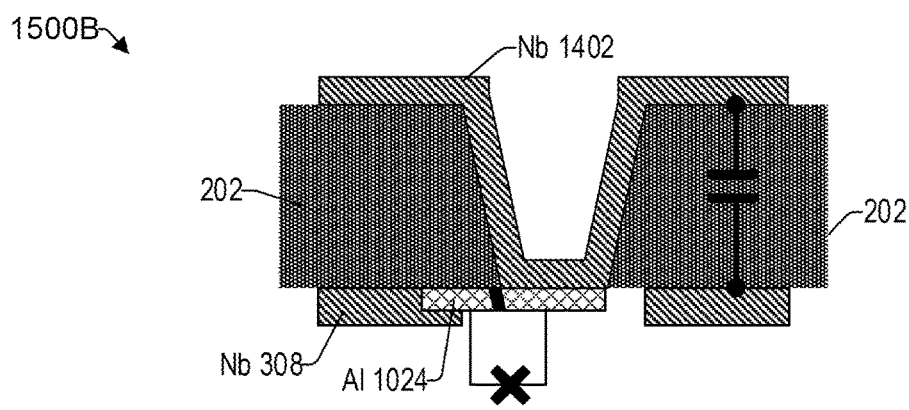
Figure 15C:
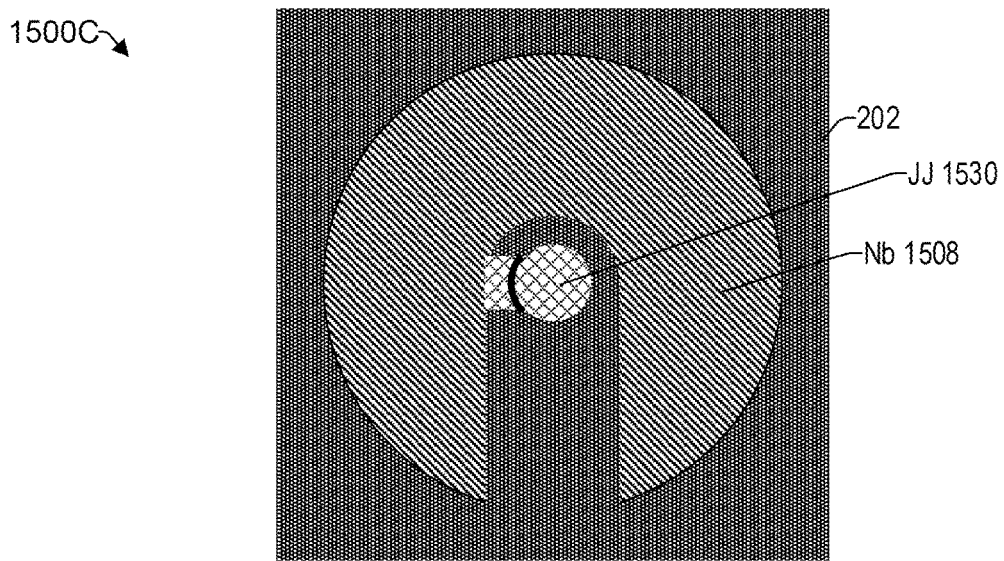

FIG. 15 provides a top view 1500A, a cross-section view 1500B, and a bottom view 1500C after a photo resist 306 and 506 of FIG. 14 has been removed, consistent with an illustrative embodiment. FIG. 15A illustrates that the Nb layer 1508 can have a circular structure. As illustrated in the bottom view 1500C, the JJ 1530 has removed therefrom the Nb and photoresist layers immediately below it. The parallel plate capacitance between the Nb layers 308 and 1402 can have a capacitance of 50 fF, sometimes referred to herein as the shunting capacitor. The shunting capacitor 920 plates for the transmon structure 900B can be asymmetrical to the vertical resonator. Stated differently, the lateral width of the top plate (e.g., Nb 808) can be longer than the lateral width of the bottom plate (e.g., Nb 308).

Figure 16A:
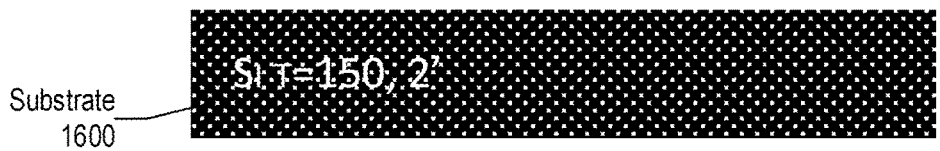
FIG. 16A provides an example substrate on which the transmon qubit structure can be fabricated, consistent with an illustrative embodiment.
Figure 16B:
FIG. 16B provides a deposition mask for the bottom electrodes, consistent with an illustrative embodiment.

Reference now is made to processing steps that do not involve electron beams and/or double angle deposition in the fabrication of a transmon qubit structure. FIG. 16A provides an example substrate 1600 on which the transmon qubit structure can be fabricated, consistent with an illustrative embodiment. In one embodiment, the substrate is Si, although other substrates are contemplated as well. A mask for the bottom electrodes is deposited 1602, as illustrated in FIG. 16B.

Figure 16C:
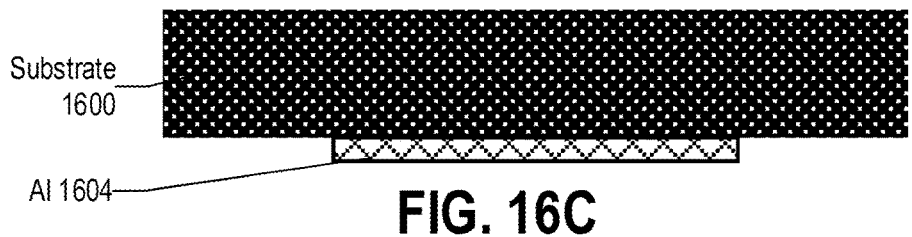
FIG. 16C illustrates a cross-section view of a deposit and lift-off of aluminum to create an electrode at the bottom of the semiconductor structure, consistent with an illustrative embodiment.

FIG. 16C illustrates a cross-section view of a deposit and lift-off of Al 1604 to create an electrode at the bottom of the semiconductor structure.

Figure 16D:
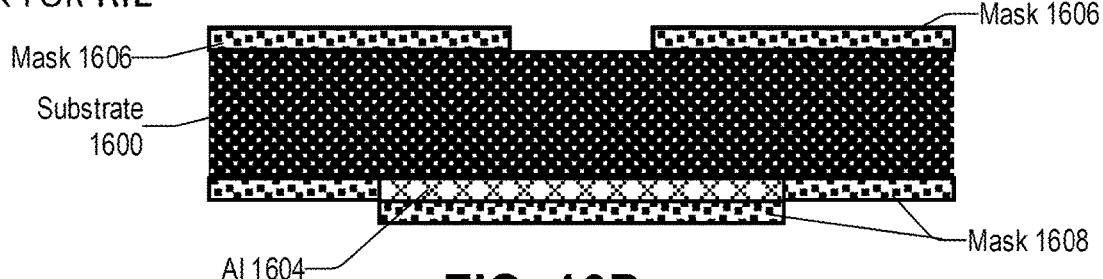
FIG. 16D illustrates a cross-section view of a deposition of mask layers on the top and bottom surface of the semiconductor structure, respectively, consistent with an illustrative embodiment.

FIG. 16D illustrates a cross-section view of a deposition of mask layers 1606 and 1608 on the top and bottom surface of the semiconductor structure, respectively, consistent with an illustrative embodiment. In one embodiment, the deposition of the mask layers 1606 and 1608 is by way of RIE.

Figure 16E:
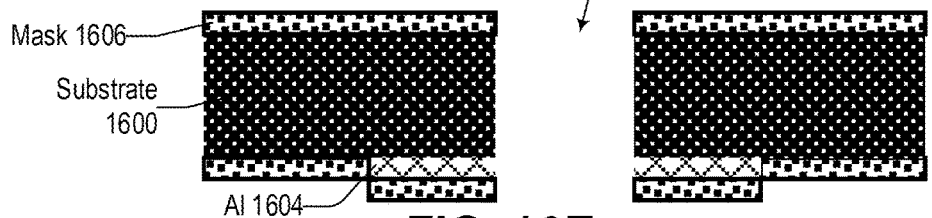
FIG. 16E illustrates a cross-section view of a fabrication of a through silicon via, consistent with an illustrative embodiment.
Figure 16F:
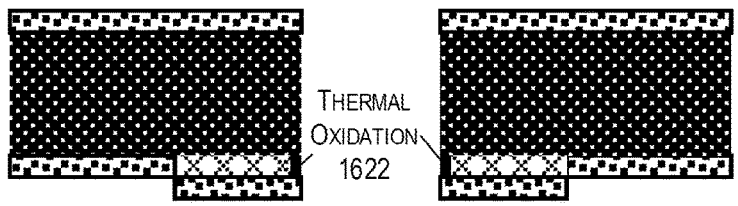
FIG. 16F illustrates a thermal oxidation of the bottom electrode sidewall, consistent with an illustrative embodiment.

FIG. 16E illustrates a cross-section view of a fabrication of a TSV, consistent with an illustrative embodiment. For example, RIE may be used to create the TSV 1620. There is thermal oxidation of the bottom electrode sidewall 1622, as illustrated in FIG. 16F.

Figure 16G:
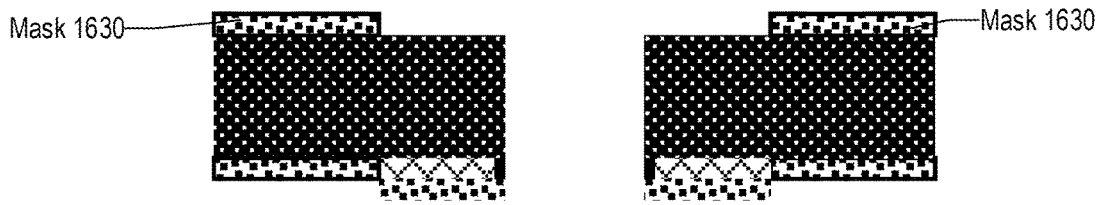
FIG. 16G illustrates the removal of the top resist and application of another mask for the top electrode, consistent with an illustrative embodiment.

FIG. 16G illustrates the removal of the top resist and application of another mask for the top electrode, consistent with an illustrative embodiment.

Figure 16H:
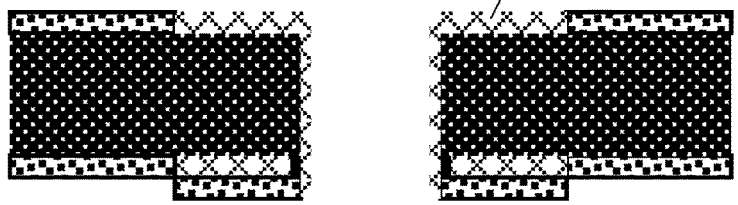
FIG. 16H illustrates a deposition of aluminum (Al) on the top and the sidewall of the through silicon via, consistent with an illustrative embodiment.
Figure 16I:
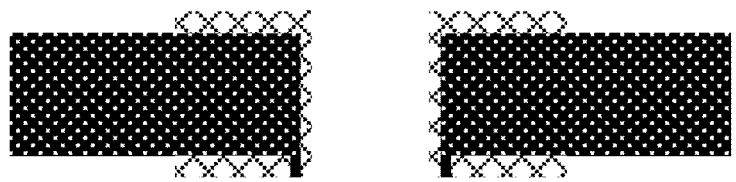
FIG. 16I illustrates a removal of all masks from FIG. 16G, consistent with an illustrative embodiment.

FIG. 16H illustrates a deposition of aluminum (Al) 1632 on the top and the sidewall of the TSV, consistent with an illustrative embodiment. All masks are then removed, as illustrated in FIG. 16L.

Figure 17B:
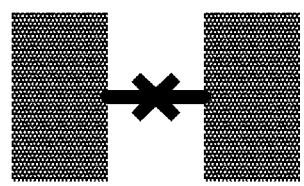
FIG. 17B provides a symbolic representation of the transmon qubit of FIG. 16I.
Figure 17A:
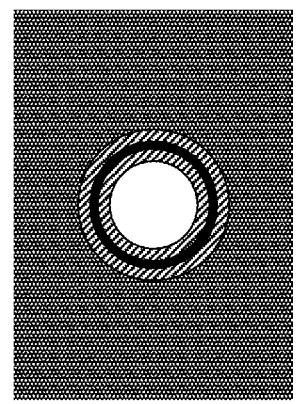
FIG. 17A provides a top view of the semiconductor structure of FIG. 16I, consistent with an illustrative embodiment.

The overall geometry of the transmon qubit structure of FIG. 16L and functionality may be better understood by way of a separate view. To that end, FIG. 17A provides a top view 17A of the semiconductor structure of FIG. 16L, consistent with an illustrative embodiment. FIG. 17B provides a symbolic representation of the transmon qubit of FIG. 16L.

While the manufacture of a single vertical transmon structure is described for the purposes of discussion, it will be understood that other configurations, as well as those having multiple transmons and/or TSVs are supported by the teachings herein. The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip may be mounted in a single chip package (such as a plastic carrier, with leads that are affixed to a motherboard or other higher-level carrier) or in a multichip package (such as a ceramic carrier that has either or both surface interconnections or buried interconnections). In any case, the chip can then be integrated with other chips, discrete circuit elements, and/or other signal processing devices as part of either (a) an intermediate product, such as a motherboard, or (b) an end product. The end product can be any product that includes integrated circuit chips, ranging from low-end applications, such as toys, to advanced computer products having a display, a keyboard or other input device, and a central processor.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of fabricating vertical transmon qubit structure, comprising:
   providing a substrate having a top surface and a bottom surface;
   providing a first layer of aluminum (Al) on the bottom surface the substrate;
   providing a first photoresist layer on portions of the bottom surface of the substrate and the first layer of Al;
   providing a first layer of niobium (Nb) on a bottom side of the substrate;
   providing a second photoresist layer on the top surface of the substrate with an opening in a center portion of the substrate;
   creating a through silicon via (TSV) in the center portion of the substrate by way of etching the substrate in the center portion of the substrate;
   depositing a second layer of Al within the TSV;
   removing portions of the second photoresist layer;
   depositing a second layer of Nb on a top side of the substrate; and
   removing the first Nb layer below the first resist layer and the second Nb layer above the second resist layer as well the first and second resist layers.

2. The method of claim 1, wherein the substrate is silicon (Si).

3. The method of claim 1, wherein the layer of aluminum on the bottom surface of the substrate has a vertical width of 50 nm and a thickness of 200 nm.

4. The method of claim 1, further comprising removing a natural oxide on the first layer of Al before providing the first layer of Nb on the bottom side of the substrate.

5. The method of claim 1, wherein a parallel plate capacitance between the first Nb layer and the second Nb layer is 50 fF.

6. The method of claim 1, further comprising removing a natural oxide on the second layer of Al before providing the second layer of Nb.

7. The method of claim 1, wherein either the first Nb layer or the second Nb layer is capacitively coupled to a vertical resonator.

8. A method of fabricating vertical transmon qubit structure, comprising:
   providing a substrate having a top surface and a bottom surface;
   providing a first layer of aluminum (Al) on the bottom surface the substrate;
   providing a first photoresist layer on portions of the bottom surface of the substrate and the first layer of Al;
   providing a second photoresist layer on the top surface of the substrate with an opening in a center portion of the substrate;
   providing a first layer of niobium (Nb) on a bottom side of the substrate;
   creating a through silicon via (TSV) in the center portion of the substrate by way of etching the substrate in the center portion of the substrate;
   providing a self-assembled monolayer (SAM) of a third photoresist layer on the bottom side and a top side of the substrate but not in a middle portion of the first photoresist layer;
   depositing a second layer of Al within a base of the TSV;
   removing the third photoresist layer;
   depositing a second layer of Nb on a top side of the substrate; and
   removing the first Nb layer below the first resist layer and the second Nb layer above the second resist layer as well the first and second resist layers.

9. The method of claim 8, wherein the deposition of the second layer of aluminum (Al) is by way of a selective atomic layer deposition (ALD).

10. The method of claim 8, wherein the substrate is silicon (Si).

11. The method of claim 8, wherein the layer of aluminum on the bottom surface of the substrate has a vertical width of 50 nm and a thickness of 200 nm.

12. The method of claim 8, further comprising removing a natural oxide on the first layer of Al before providing the first layer of Nb on the bottom side of the substrate.

13. The method of claim 8, wherein a parallel plate capacitance between the first Nb layer and the second Nb layer is 50 fF.

14. The method of claim 8, further comprising removing a natural oxide on the second layer of Al before providing the second layer of Nb.

15. The method of claim 8, wherein either the first Nb layer or the second Nb layer is capacitively coupled to a vertical resonator.

16. The method of claim 8, further comprising providing an insulator layer between the first layer of Al and the second layer of Al comprising aluminum oxide ($Al_2O_3$).

\* \* \* \* \*